US010044921B2

(12) United States Patent
Morita et al.

(10) Patent No.: US 10,044,921 B2
(45) Date of Patent: Aug. 7, 2018

(54) VIDEO CONFERENCING SUPPORT DEVICE

(71) Applicant: DENSO International America, Inc., Southfield, MI (US)

(72) Inventors: Naoki Morita, San Jose, CA (US); Naomi Stroud, San Francisco, CA (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/240,763

(22) Filed: Aug. 18, 2016

(65) Prior Publication Data
US 2018/0054561 A1    Feb. 22, 2018

(51) Int. Cl.
H04N 7/14    (2006.01)
H04N 5/232   (2006.01)
H04N 7/15    (2006.01)
H04M 1/725   (2006.01)

(52) U.S. Cl.
CPC .... H04N 5/23203 (2013.01); H04M 1/72533 (2013.01); H04N 5/23219 (2013.01); H04N 7/142 (2013.01); H04N 7/15 (2013.01); H04M 1/7253 (2013.01); H04M 1/72527 (2013.01); H04N 2007/145 (2013.01)

(58) Field of Classification Search
CPC combination set(s) only.
See application file for complete search history.

(56) References Cited

U.S. PATENT DOCUMENTS

| | | | |
|---|---|---|---|
| 6,793,415 B2 * | 9/2004 | Arbuckle | F16M 11/10 348/373 |
| 2003/0193588 A1 | 10/2003 | Yuen et al. | |
| 2006/0109375 A1 * | 5/2006 | Ho | H04N 5/2251 348/376 |
| 2009/0046258 A1 * | 2/2009 | Schnuckle | G03B 21/14 353/94 |
| 2012/0239396 A1 * | 9/2012 | Johnston | G06F 3/017 704/235 |
| 2013/0335587 A1 * | 12/2013 | Takatsuka | H04N 5/23219 348/211.4 |

(Continued)

FOREIGN PATENT DOCUMENTS

| | | |
|---|---|---|
| JP | 6270076 | 9/1994 |
| JP | 8166618 | 6/1996 |

(Continued)

*Primary Examiner* — Joseph J Nguyen
(74) *Attorney, Agent, or Firm* — Harness, Dickey & Pierce, P.L.C.

(57) ABSTRACT

A system and method are provided and include a rotatable smartphone cradle mounted in a pedestal and configured to receive a first smartphone. The pedestal has a controller configured to communicate with a remote control server. The first smartphone is configured for video conferencing with a second smartphone. The remote control server receives control commands from the second smartphone for rotating the first smartphone in the rotatable smartphone cradle while the second smartphone is video conferencing with the first smartphone. The remote control server communicates the control commands to the controller. The controller controls a rotational actuator to rotate the first smartphone in the rotatable smartphone cradle based on the received control commands.

8 Claims, 4 Drawing Sheets

(56) References Cited

U.S. PATENT DOCUMENTS

| | | | | |
|---|---|---|---|---|
| 2014/0333252 A1* | 11/2014 | Raponi | ............... | H02J 7/025 |
| | | | | 320/108 |
| 2015/0195489 A1* | 7/2015 | Sobti | ............... | H04N 7/142 |
| | | | | 348/14.08 |
| 2015/0217449 A1* | 8/2015 | Meier | ............... | B25J 9/1602 |
| | | | | 700/257 |
| 2015/0260333 A1* | 9/2015 | Polyakov | ............ | F16M 11/041 |
| | | | | 248/176.3 |

FOREIGN PATENT DOCUMENTS

| | | |
|---|---|---|
| JP | 2004128997 A | 4/2004 |
| JP | 2008141704 A | 6/2008 |
| JP | 2012049781 A | 3/2012 |

\* cited by examiner

… (1)

VIDEO CONFERENCING SUPPORT DEVICE

FIELD

The present disclosure relates to systems and methods for video conferencing and, more particularly, to systems and methods for video conferencing using a video conferencing support device with a remotely controlled rotatable smartphone cradle.

BACKGROUND

This section provides background information related to the present disclosure, which is not necessarily prior art.

In existing video conferencing systems utilizing smartphones, a smartphone is generally held and controlled by a video conference participant in a meeting room. As such, a remote video conference participant is not able to control the camera of the smartphone device in the meeting room and may not be able to see other video conference participants or particular information in the meeting room. In addition, the remote video conference participant may have difficulty sharing documents or other information during the video conference. In addition, the remote video conference participant may have difficulty pointing out particular information in the meeting room. As such, existing video conferencing systems, including video conferencing systems that utilize smartphones, are subject to improvement.

SUMMARY

This section provides a general summary of the disclosure, and is not a comprehensive disclosure of its full scope or all of its features.

The present teachings include systems and methods for a video conferencing support device. A rotatable smartphone cradle is mounted in a pedestal and configured to receive a first smartphone. The pedestal has a controller configured to communicate with a remote control server. The first smartphone is configured for video conferencing with a second smartphone. The remote control server receives control commands from the second smartphone for rotating the first smartphone in the rotatable smartphone cradle while the second smartphone is video conferencing with the first smartphone. The remote control server communicates the control commands to the controller. The controller controls a rotational actuator to rotate the first smartphone in the rotatable smartphone cradle based on the received control commands.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present teachings include a pedestal with a remotely controlled rotatable smartphone cradle. As discussed in further detail below, during a video conference, a remote video conference participant can remotely control the rotatable smartphone cradle so that the camera of the smartphone attached to the smartphone cradle is pointed at a particular person or object in the meeting room. In addition, the pedestal includes a remotely controlled laser pointer so that a remote video conference participant can point the laser pointer at a particular spot or object in the meeting room, such as a projected document or presentation. In addition, the pedestal also includes a remotely controlled projector so that a remote video conference participant can project a document, an image, a video, or other data or information onto a wall or ceiling of the meeting room. As such the remote video conference participant can more fully engage and participate in the video conference with the participants in the meeting room.

Figure 1:
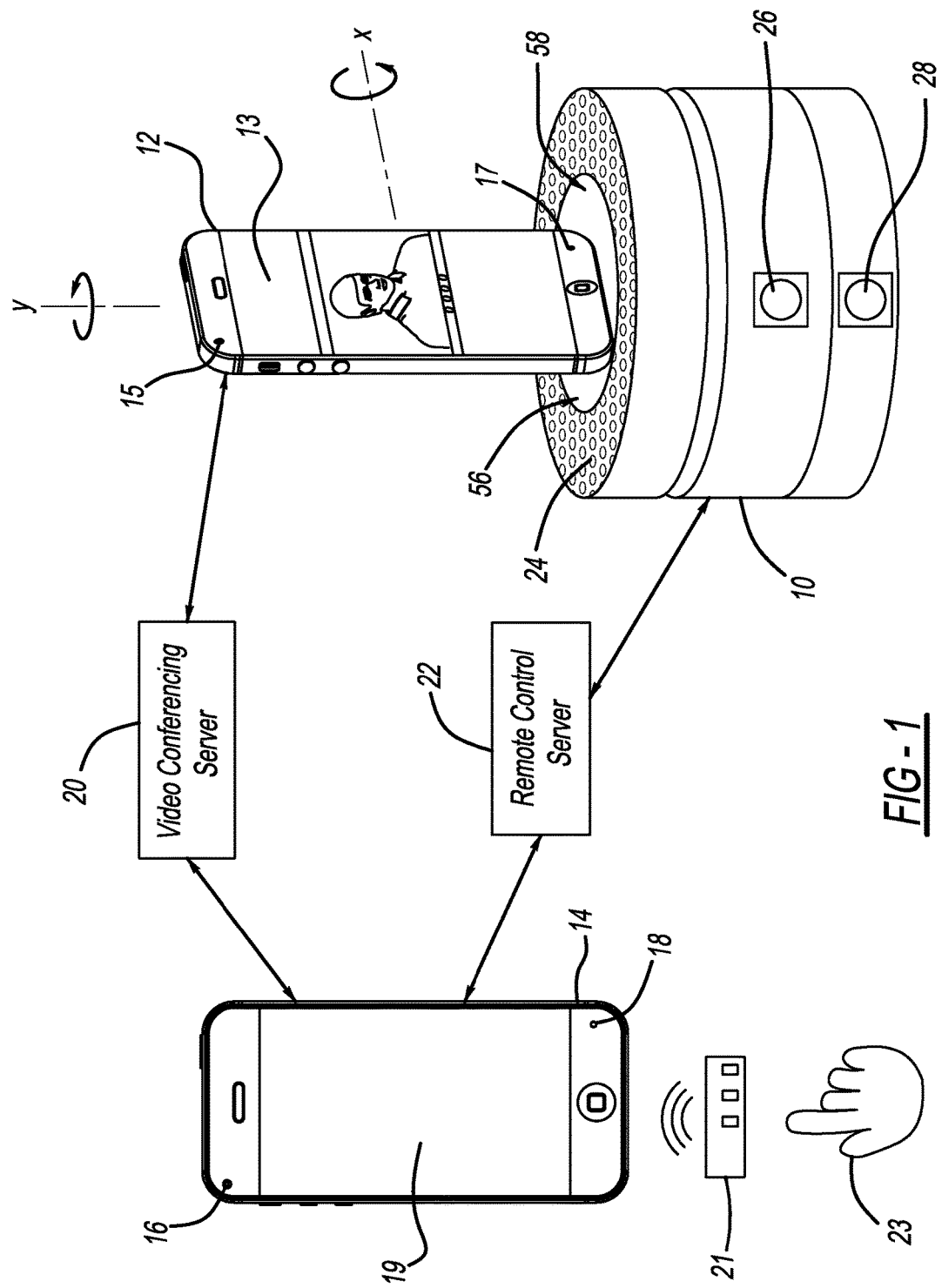
FIG. 1 illustrates a video conferencing system utilizing smartphones according to the present teachings.

With reference to FIG. 1, a system for video conferencing includes a pedestal 10 with a remotely controlled smartphone cradle. In the example of FIG. 1, the pedestal 10 and a smartphone 12 are located in a meeting room. For example, one or more video conference participants may be located in the meeting room and participating in the video conference. As shown in FIG. 1, the smartphone 12 is mounted and secured to the pedestal 10 by the smartphone cradle. The smartphone 12 includes a video screen 13, a camera 15, and a microphone 17.

The system for video conferencing also includes a remote smartphone 14, which is located remotely from the meeting room and the location of the smartphone 12 and the pedestal 10. The remote smartphone 14 includes a video screen 19, a camera 16, and a microphone 18.

The smartphone 12 and the remote smartphone 14 are each connected to a video conferencing server 20. For example, the smartphones 12, 14 are each configured with a video conferencing application that connects to the video conferencing server 20 that receives and sends audio and video data between the smartphones 12, 14. For example, the smartphones 12, 14 can each be configured with a video conferencing application, such as SKYPE™ or FACETIME®. The smartphones 12, 14 can each connect to the video conferencing server 20 via a network connection. For example, the smartphones 12, 14 can each connect to the video conferencing server 20 over the internet. The smartphone 12 sends video data from the camera 15 and audio data from the microphone 17 to the video conferencing server 20, which receives and sends the video data and audio data to the remote smartphone 14. The remote smartphone 14 receives and outputs the video data and audio data on the remote smartphone 14. The video data is displayed on the video screen 19. Likewise, the remote smartphone 14 sends video data from the camera 16 and audio data from the microphone 18 to the video conferencing server 20, which receives and sends the video data and audio data to the smartphone 12. The smartphone 12 receives and outputs the video data and audio data on the smartphone 12. The video data is displayed on the video screen 13.

The pedestal includes a speaker 24 in communication with the smartphone 12 via a wireless personal area network (WPAN). For example, the WPAN connection may be a BLUETOOTH® or other suitable WPAN connection. The smartphone 12 can receive audio data for the video conference from the video conferencing server 20 and output the audio data to the speaker 24 of the pedestal 10 through the WPAN connection. Alternatively, the pedestal 10 may include a wired cable connection. In such case, the smartphone 12 can output the audio data for the video conference to the speaker 24 through the wired cable connection.

The remote smartphone 14 and the pedestal 10 are each connected to a remote control server 22. For example, the remote smartphone 14 and the pedestal 10 can each connect to the remote control server 22 over the internet. The remote control server 22 receives control commands from the remote smartphone 14 and sends them to the pedestal 10.

Figure 4:
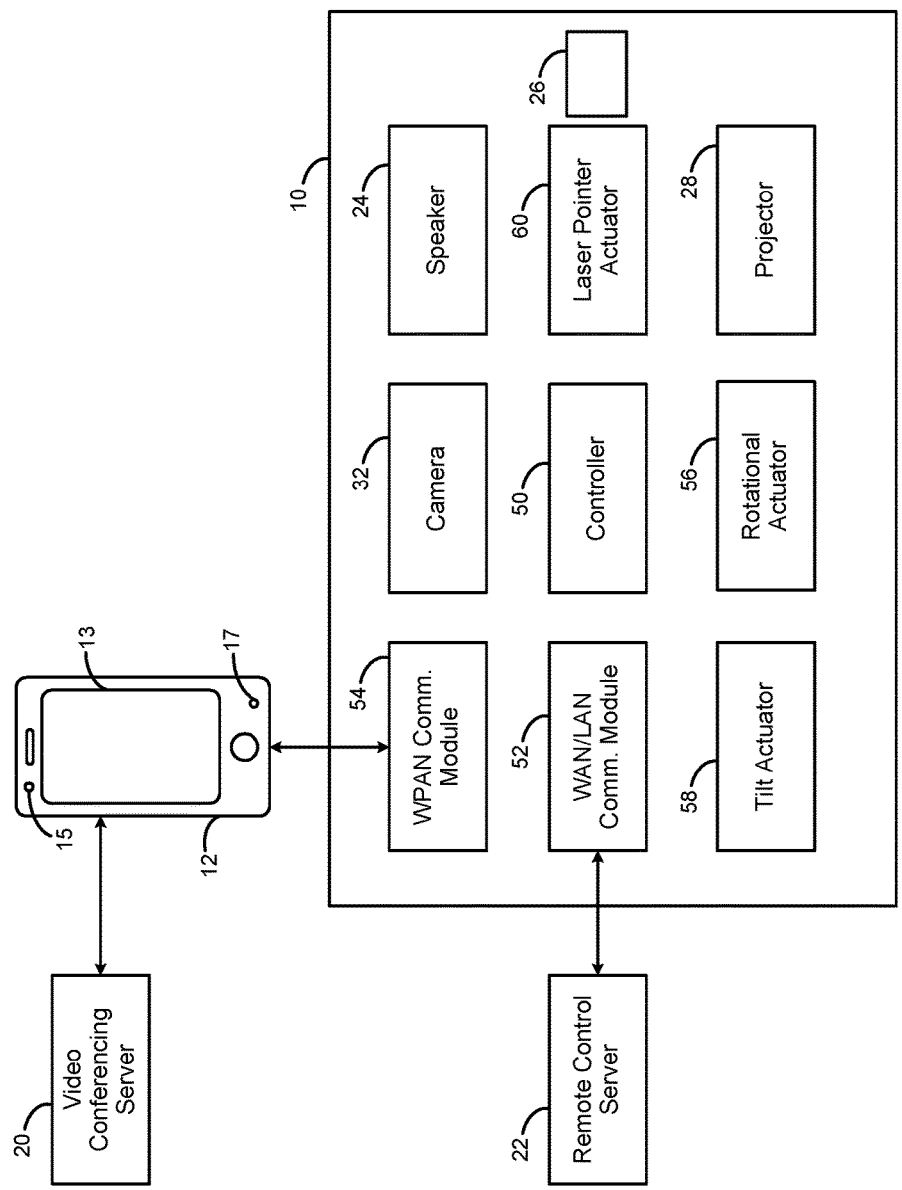
FIG. 4 illustrates a block diagram of a video conferencing system according to the present teachings.

The pedestal 10 includes a rotational actuator 56 and a tilt actuator 58 (also shown in FIG. 4). The rotational actuator 56 of the pedestal 10 can rotate the smartphone 12 around a vertical y-axis of the smartphone 12, as shown in FIG. 1. Additionally, the tilt actuator 58 can tilt the smartphone 12 forward and backward by tilting the smartphone 12 around a horizontal x-axis of the smartphone 12, as shown in FIG. 1.

The remote smartphone 14 can send control commands to the pedestal 10 through the remote control server 22 to control the rotational actuator 56 and the tilt actuator 58. In this way, during a video conference, a user of the remote smartphone 14 is able to rotate and tilt the smartphone 12 in the meeting room. By rotating and tilting the smartphone 12 in the meeting room, the user of the remote smartphone can point the camera 15 of the smartphone 12 to be directed towards any person or object in the meeting room.

Additionally, the remote smartphone 14 can send control commands to the pedestal 10 through the remote control server 22 to control the laser pointer 26. In this way, during a video conference a user of the remote smartphone 14 is able to use the laser pointer 26 of the pedestal 10 to point at specific objects in the meeting room, such as portion of a presentation or document being projected in the meeting room. A direction of the laser pointer 26 is controlled by a laser pointer actuator 60 (shown in FIG. 4) that can rotate and move the laser pointer 26 in all directions.

Additionally, the remote smartphone 14 can send control commands to the pedestal through the remote control server 22 to control the projector 28. For example, with reference to FIG. 2, the remote smartphone 14 can send a document 30, such as a presentation, to the pedestal 10 through the remote control server 22. In response, the pedestal 10 can project the document 30, such as the presentation, using the projector 28 onto a ceiling or wall of the meeting room. For further example, the remote smartphone 14 can send a document, image, video, or other data or information to the pedestal 10 through the remote control server 22. In response, the pedestal 10 can project the document, image, video, or other data or information using the projector 28 onto the ceiling or wall of the meeting room.

Figure 2:
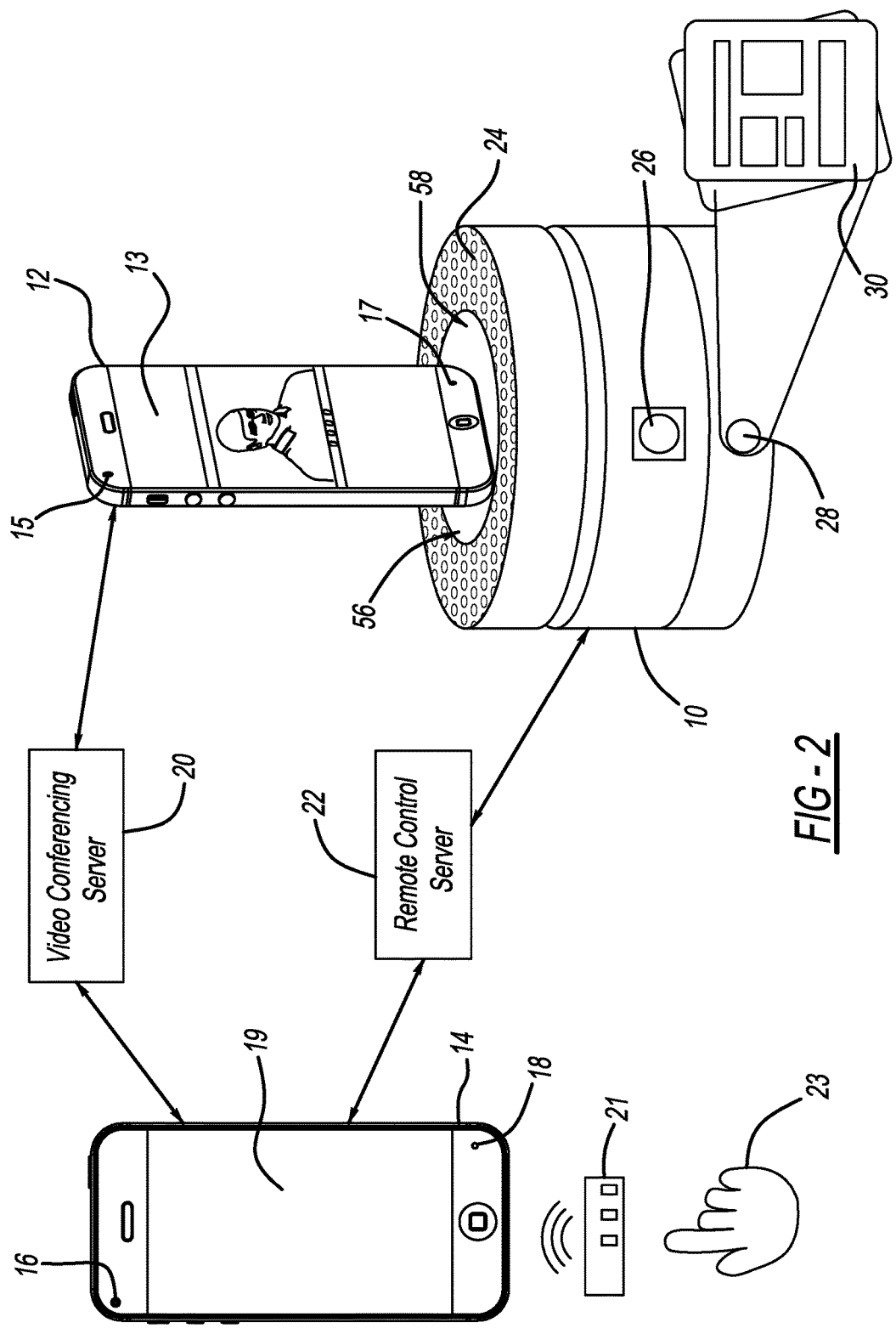
FIG. 2 illustrates the video conferencing system utilizing smartphones according to the present teachings projecting a document.

As shown in FIGS. 1 and 2, the remote smartphone 14 is connected to a gesture recognition device 21. For example, the gesture recognition device 21 can include a camera and can detect and recognize hand gestures, as represented by hand 23. Additionally or alternatively, the gesture recognition device 21 may detect user movements, such as blinking of one or both of the user's eyes and/or movement of the user's eyes to look in a specific direction, such as up, down, to the left, to the right, etc. The gesture recognition device 21 may detect other movements or gestures of the user such as head movements, arm movements, shoulder movements, and/or any other detectable user movements. Additionally or alternatively, the gesture recognition device 21 may track an object, such as a stylus, pen, ball, or other object, held by or attached to the user. The gesture recognition device 21 can be connected to the remote smartphone 14 via a WPAN, such as a BLUETOOTH® or other suitable WPAN connection.

The remote smartphone 14 is configured with a remote control application that receives the recognized gestures and/or user movements from the gesture recognition device 21. In response, the remote control application generates control commands, based on the recognized gestures and/or user movements, and outputs the control commands to the pedestal 10 through the remote control server 22. The remote control application may be programmed with a mapping of recognized hand gestures and/or user movements to particular control commands. For example, pointing a finger to the right or to the left may correspond to a control command to rotate the rotational actuator 56 of the pedestal 10 to the right or to the left, respectively. In such case, the gesture recognition device 21 may recognize that the user of the remote smartphone 14 is making a hand gesture of pointing to the right or to the left and may generate and output a corresponding control command to the pedestal, through the remote control server 22, to appropriately rotate the smartphone 12 to the right or to the left using the rotational actuator 56 (also shown in FIG. 4). Similarly, pointing a finger up or down may correspond to a control command to tilt the smartphone 12 up or down, respectively. In such case, the gesture recognition device 21 may recognize that the user of the remote smartphone 14 is making a hand gesture of pointing up or down and may generate and output a corresponding control command to the pedestal, through the remote control server 22, to appropriately tilt the smartphone 12 up or down using the tilt actuator 58 (also shown in FIG. 4). Similarly, particular control commands may be mapped to other user movements, such as blinking of the eyes, eye movements, movements of the head, shoulders, arms, etc., and/or movement of an object, such as a stylus, pen, or other object, held by or attached to the user. In this way, a user of the remote smartphone 14 can control the rotational actuator 56 and the tilt actuator 58 of the pedestal 10 during a video conference to control and point the camera 15 of the smartphone 12 towards any person or object in the meeting room. Additional hand gestures may be mapped to control commands to control the laser pointer 26 and the projector 28 of the pedestal 10. In this way, the user of the remote smartphone 14 can use hand gestures to quickly switch between: controlling the rotational actuator 56 to rotate the smartphone 12; controlling the tilt actuator 58 to tilt the smartphone 12; controlling the laser pointer actuator 60 to point the laser pointer 26 at a particular location in the meeting room; and/or controlling the projector 28 to project a document, image, video, or other data or information on a ceiling or wall of the meeting room. Because particular hand gestures are mapped to particular control commands, the user of the remote smartphone 14 can quickly switch between these control modes of the pedestal. For example, the user of the remote smartphone 14 can quickly rotate or tilt the smartphone 14 towards a particular person in the meeting room, then quickly control the projector 28 to project a document, image, video, or other data or information onto a ceiling or wall of the meeting room, and then quickly control the laser pointer 26 to point at a particular location on the projected document, image, video, or other data or information by using the hand gestures corresponding to these control commands in rapid succession. The remote control application may be user-configurable such that the user can map hand gestures to particular control commands for the pedestal 10.

Alternatively, another input device could be used in place of the gesture recognition device 21. For example, a joystick, a touchpad, or keyboard arrows could be used in place of the gesture recognition device 21 to receive for the control commands. Alternatively, a touchscreen of the remote smartphone 14 could be used to receive input for the control commands.

As shown in FIGS. 1 and 2, the gesture recognition device 21 is separate from and in communication with the remote smartphone 14. Alternatively, the remote smartphone 14 can include a second camera and can perform gesture recognition using the second camera and a gesture recognition application either separate from the remote control application or integrated within the remote control application.

Figure 3:
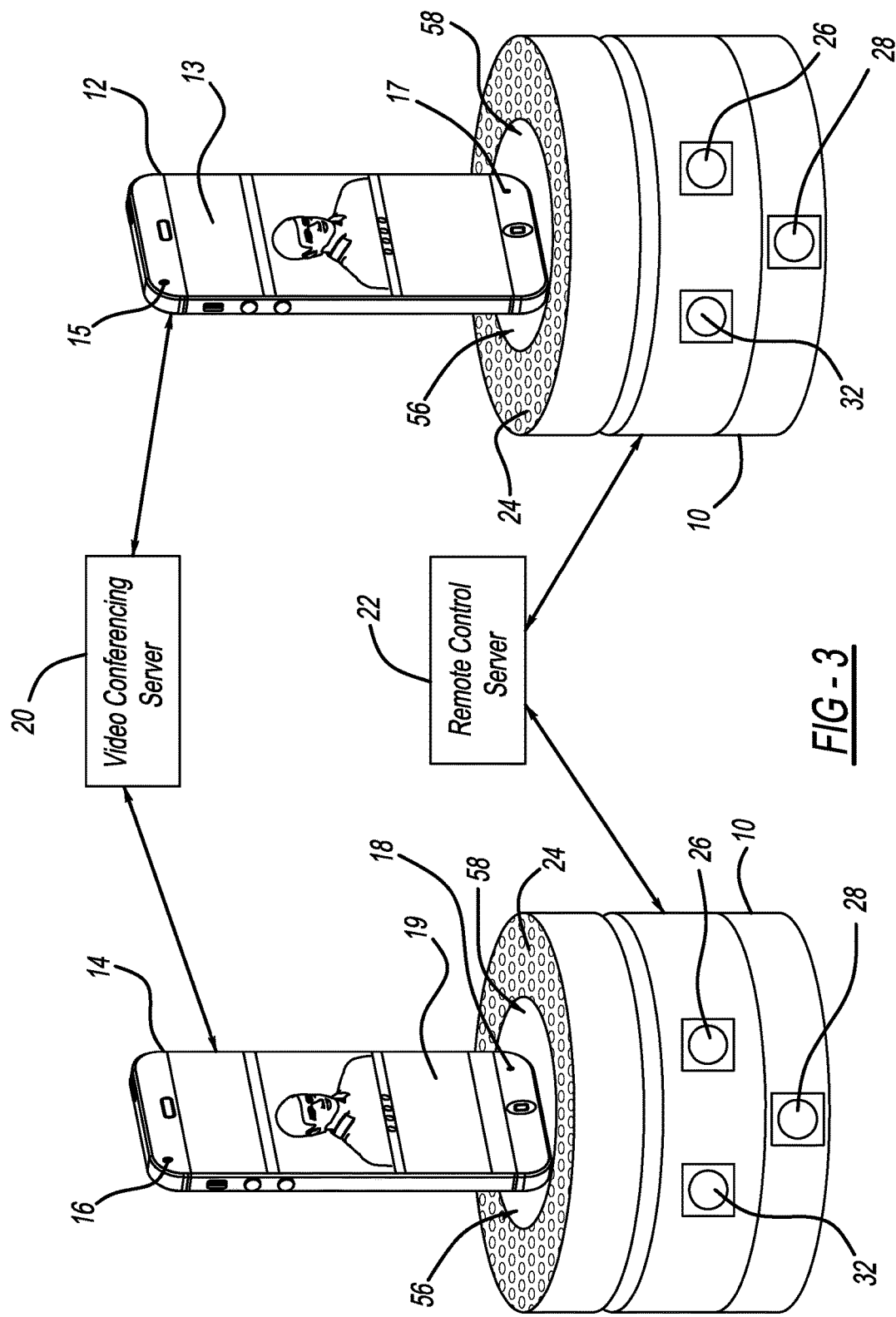
FIG. 3 illustrates another video conferencing system utilizing smartphones according to the present teachings.

With reference to FIG. 3, another system for video conferencing is illustrated. The pedestals 10 shown in FIG. 3 are similar to the pedestal 10 shown in FIGS. 1 and 2, except that the pedestals 10 shown in FIG. 3 each include an additional camera 32. As such, the pedestals 10 shown in FIG. 3 can each perform gesture recognition. Further, in the system shown in FIG. 3, both the smartphone 12 and the remote smartphone 14 are used with a pedestal 10. In this way, both the user of the smartphone 12 and the user of the remote smartphone 14 can send control commands to the pedestal 10 at the other user's location. For example, the user of the smartphone 12 in the meeting room can use hand gestures to generate control commands that are sent to the pedestal 10 at the remote location, including control commands to rotate or tilt the remote smartphone 14 and control commands to control the laser pointer 26 and projector 28 of the pedestal at the remote location. As such, the pedestals 10 can allow for two-way control and communication between the pedestals 10 such that a user in the meeting room can control the pedestal 10 at the remote location and a user of the remote smartphone 14 can control the pedestal 10 in the meeting room.

As noted above, the pedestals 10 shown in FIG. 3 include a camera 32. Based on image data received from the camera 32, the controller 50 (shown in FIG. 4) of the pedestal 10 can perform gesture recognition. As such, the controller 50 of the pedestal 10 can recognize gestures or other movements, as described above, of a user of the smartphone 12 or the remote smartphone 14 and can determine corresponding control commands to communicate to the other pedestal through the remote control server 22. Further, the controller 50 can perform gesture recognition based only the image data from the camera 32 on the pedestal 10. Alternatively, the controller 50 can perform gesture recognition based on image data from the camera 32 on the pedestal 10 and based on image data from a camera of the smartphone 12 (or on the remote smartphone 14). For example, the controller 50 of the pedestal 10 can receive image data communicated from the smartphone 12 (or the remote smartphone 14) via a WPAN communication connection, such as a BLUETOOTH® or other suitable WPAN connection. Additionally or alternatively, the system may include a separate camera and gesture recognition device, such as the gesture recognition device 21 shown in FIG. 1. In such case, the pedestal 10 can communicate with the gesture recognition device 21 via a WPAN communication connection, such as a BLUETOOTH® or other suitable WPAN connection and the controller 50 can perform gesture recognition based on image data from the gesture recognition device 21.

With reference to FIG. 4, a block diagram of a video conferencing system, including a block diagram of the pedestal 10, is shown. The pedestal 10, for example, includes a controller that controls the components of the pedestal 10 and communicates with the smartphone 12 and the remote control server 22.

In this application, including the definitions below, the terms "module," "controller," control module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules, controllers, control modules, and systems described herein. In addition, in this application the terms "module," "controller," or "control module" may be replaced with the term "circuit."

The controller 50, for example, utilizes a WAN/LAN communication module 52 to communicate with the remote control server 22. The WAN/LAN communication module 52, for example, may allow the pedestal 10 to communicate with a WiFi network or with a cellular data network, such as an LTE or 3G network. The controller also utilizes a WPAN communication module 54 to communicate with the smartphone 12. As discussed above, the WPAN communication module 54 may utilize a BLUETOOTH® communication protocol.

The controller 50 receives control commands from the remote control server 22, as discussed above, and controls the rotational actuator 56 and the tilt actuator 58 to rotate and tilt the smartphone 12 positioned on the pedestal 10 in the smartphone cradle. The rotational actuator 56 and the tilt actuator 58 are mechanical actuators used to appropriately rotate and tilt the smartphone 12 positioned on the pedestal 10 in the smartphone cradle. The controller 50 also receives control commands from the remote control server 22 for controlling the laser pointer 26. For example, the controller 50 can control the laser pointer 26 using the laser pointer actuator 60. The laser pointer 26 may include a laser diode emitting a narrow coherent low-powered laser beam of visible light. The laser pointer actuator 60 is a mechanical actuator used to point the laser pointer 26 up, down, left, and right.

The controller 50 can receive audio data for the video conference from the smartphone 12. As discussed above, audio and video data of the video conference is received by the smartphone 12 from the video conferencing server 20. The audio data is received by the controller 50 from the smartphone 12 through the WPAN communication module 54. The controller 50 then outputs the audio data to the speaker 24.

The controller 50 can receive documents from the remote control server 22, as discussed above, and control the projector 28 to project the document into the meeting room.

If the pedestal 10 includes a camera 32, as shown in FIGS. 3 and 4, the controller 50 can receive image data from the camera 32 and perform gesture recognition to determine whether a user of the smartphone 12 in the meeting room is making any gestures that corresponds to a designated control command.

In this way, the pedestal 10 described herein provides users with higher levels of engagement, interaction, and involvement in video conferences using smartphones 12, 14.

In addition, the pedestal 10 described herein allows a remote user to control and more actively lead and participate in video conferences.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
a pedestal having a top layer and a lower layer, the top layer being located above the lower layer relative to a vertical axis of the pedestal;
a rotatable smartphone cradle mounted in the top layer of the pedestal and configured to receive a first smartphone, the pedestal having a controller configured to communicate with a remote control server and the first smartphone being configured for video conferencing with a second smartphone, the first smartphone and the second smartphone each being configured with a video conferencing application that communicates with a video conferencing server that receives and sends audio and video data between the first smartphone and the second smartphone, and the second smartphone being configured with a remote control application that communicates control commands from the second smartphone to the remote control server; and
a projector mounted in the lower layer of the pedestal;
wherein the remote control server is configured to receive the control commands from the second smartphone for rotating the first smartphone in the rotatable smartphone cradle and for controlling the projector while the second smartphone is video conferencing with the first smartphone, the remote control server is configured to communicate the control commands to the controller, and the controller is configured to control a rotational actuator to rotate the first smartphone in the rotatable smartphone cradle around the vertical axis and to control the projector based on the control commands received from the remote control server, the rotatable smartphone cradle in the top layer being rotatable relative to the lower layer, and the lower layer including the projector being fixed and non-rotatable relative to the top layer;
wherein the remote control server is configured to receive a document from the second smartphone and to communicate the document to the controller of the pedestal while the second smartphone is video conferencing with the first smartphone; and
wherein the controller of the pedestal is configured to control the projector to project the document received from the remote control server while the second smartphone is video conferencing with the first smartphone.

2. The system of claim 1, wherein the controller also controls a tilt actuator to tilt the first smartphone in the rotatable smartphone cradle based on the control commands from the remote control server.

3. The system of claim 1, wherein the pedestal includes a speaker and wherein the controller is configured to receive audio data from the first smartphone while the first smartphone is video conferencing with the second smartphone and to output the audio data to the speaker.

4. The system of claim 1, wherein the pedestal includes a laser pointer and wherein the controller also controls the laser pointer based on the control commands received from the remote control server.

5. The system of claim 1, wherein the remote control server is configured to receive at least one of an image and a video from the second smartphone and to communicate the at least one of the image and the video to the controller of the pedestal and wherein the controller is configured to control the projector to project the at least one of the image and the video.

6. The system of claim 1, wherein the second smartphone is configured to communicate with a gesture recognition device that recognizes gestures of a user of the second smartphone and to generate the control commands based on the recognized gestures of the user of the second smartphone.

7. The system of claim 1, wherein the second smartphone includes a first camera configured to generate image data communicated to the first smartphone through the video conferencing server while video conferencing with the first smartphone and a second camera, wherein the second smartphone is configured with a gesture recognition application that recognizes gestures of a user of the second smartphone based on image data generated by the second camera and wherein the remote control application of the second smartphone is configured to communicate the control commands based on the recognized gestures of the user of the second smartphone by the gesture recognition application.

8. The system of claim 1, wherein the pedestal includes a camera and wherein the controller is configured to recognize gestures of a user of the first smartphone based on image data generated by the camera, to generate control commands based on recognized gestures of the user of the first smartphone, and to communicate the control commands to the remote control server.

* * * * *